(12) United States Patent
Sergeev et al.

(10) Patent No.: US 9,288,002 B2
(45) Date of Patent: Mar. 15, 2016

(54) METHOD FOR MONITORING AND MANAGING DATA NETWORKS

(71) Applicant: ECI Telecom Ltd., Petach Tikva (IL)

(72) Inventors: Andrew Sergeev, Kfar Saba (IL); Yoav Valadarsky, Kfar Saba (IL)

(73) Assignee: ECI TELECOM LTD., Petach Tikva (IL)

( * ) Notice: Subject to any disclaimer, the term of this patent is extended or adjusted under 35 U.S.C. 154(b) by 252 days.

(21) Appl. No.: 13/728,492

(22) Filed: Dec. 27, 2012

(65) Prior Publication Data

US 2013/0163618 A1  Jun. 27, 2013

(30) Foreign Application Priority Data

Dec. 27, 2011 (IL) .......................................... 217232

(51) Int. Cl.
*H04J 3/07* (2006.01)
*H04J 3/06* (2006.01)

(52) U.S. Cl.
CPC ............. *H04J 3/0658* (2013.01); *H04J 3/0667* (2013.01)

(58) Field of Classification Search
CPC ............................... H04J 3/0658; H04J 3/0667
USPC .................................................. 370/519, 521
See application file for complete search history.

(56) References Cited

U.S. PATENT DOCUMENTS

| | | | | |
|---|---|---|---|---|
| 7,447,931 | B1 * | 11/2008 | Rischar et al. ................. | 713/400 |
| 2008/0075217 | A1 * | 3/2008 | Ilnicki et al. ................... | 375/356 |
| 2010/0074278 | A1 * | 3/2010 | Dobjelevski et al. ......... | 370/503 |
| 2010/0085989 | A1 * | 4/2010 | Belhadj et al. ................. | 370/503 |
| 2010/0098111 | A1 * | 4/2010 | Sun et al. ....................... | 370/509 |
| 2010/0278055 | A1 * | 11/2010 | Barry et al. .................... | 370/252 |
| 2011/0080985 | A1 * | 4/2011 | Secker et al. .................. | 375/376 |
| 2011/0122775 | A1 * | 5/2011 | Zampetti et al. .............. | 370/242 |
| 2011/0221485 | A1 * | 9/2011 | He et al. ......................... | 327/144 |
| 2011/0255546 | A1 * | 10/2011 | Le Pallec et al. ............. | 370/400 |
| 2012/0072761 | A1 * | 3/2012 | Guo et al. ....................... | 713/600 |
| 2012/0106576 | A1 * | 5/2012 | Hadzic ............................ | 370/503 |
| 2012/0155497 | A1 * | 6/2012 | Lee et al. ....................... | 370/507 |
| 2012/0269204 | A1 * | 10/2012 | Zampetti ............... | H04J 3/0667 370/503 |
| 2012/0275317 | A1 * | 11/2012 | Geva et al. ..................... | 370/250 |
| 2012/0275501 | A1 * | 11/2012 | Rotenstein .................... | 375/220 |

(Continued)

FOREIGN PATENT DOCUMENTS

WO     WO 2010057398 A1 *  5/2010

OTHER PUBLICATIONS

Lee Cosart, Precision Packet Delay Measurements using IEEE 1588v2, Oct. 3, 2007, IEEE, Symposium on Precision Clock Synchronization for Measurement, Control and Communications, pp. 85-91.*

(Continued)

*Primary Examiner* — Gerald Smarth
(74) *Attorney, Agent, or Firm* — Browdy and Neimark, PLLC

(57) ABSTRACT

A method and a network node are provided, for distributing timing information in a packet-switched network. The method is characterized in that at least one network node used as a quasi slave node is located at a path extending between a master node and a slave node. The method comprising a step of calculating the timing at that network node, by passively processing packets belonging to a PTP-type packet stream being exchanged between the master node and the slave node and conveyed via that intermediate network node operating as a quasi slave.

12 Claims, 7 Drawing Sheets

(56) References Cited

U.S. PATENT DOCUMENTS

| | | | | |
|---|---|---|---|---|
| 2012/0278421 A1* | 11/2012 | Sun et al. | | 709/208 |
| 2012/0287948 A1* | 11/2012 | Ruffini et al. | | 370/503 |
| 2012/0307845 A1* | 12/2012 | Le Pallec et al. | | 370/503 |
| 2012/0320933 A1* | 12/2012 | Magee | | 370/503 |
| 2012/0324270 A1* | 12/2012 | Magee | | 713/400 |
| 2013/0028265 A1* | 1/2013 | Ronchetti et al. | | 370/400 |
| 2013/0034197 A1* | 2/2013 | Aweya et al. | | 375/362 |
| 2013/0039920 A1* | 2/2013 | Li et al. | | 424/141.1 |
| 2013/0100832 A1* | 4/2013 | Flinn | H04L 43/0852 | 370/252 |
| 2013/0129345 A1* | 5/2013 | Meng et al. | | 398/25 |
| 2013/0170507 A1* | 7/2013 | Hsueh et al. | | 370/503 |
| 2013/0235888 A1* | 9/2013 | Bui et al. | | 370/503 |

OTHER PUBLICATIONS

Su et al., 1588v2 modules of time synchronization with frequency layer support, Jul. 6, 2009, IETF, Draft Memorandum, Pertinent pp. 1-12.*

Geoffrey M. Garner, IEEE 1588v2, Sep. 24, 2008, ISPCS, Ann Arbor '08, pp. 1-89.*

\* cited by examiner

METHOD FOR MONITORING AND MANAGING DATA NETWORKS

CROSS-REFERENCE TO RELATED APPLICATIONS

This application claims priority of Israel Patent Application No. 217232, filed Dec. 27, 2011, the disclosure of which is incorporated by reference herein in its entirety.

FIELD OF THE INVENTION

The present invention relates to the field of monitoring and managing communication networks, more specifically to monitoring specific parameters which are important for controlling timing distribution over packet-switched networks.

BACKGROUND OF THE INVENTION

In the following description the following abbreviations will be used:
MEN—Metro Ethernet Network
PTP—Precision Timing Protocol (such as described in IEEE 1588v2)
PE—Provider Edge
PDV—Packet Delay Variation
CPE—Customer Premised Equipment
eNodeB—Base station of LTE (Long term evolution 4G networks).
Master node and Slave node—network nodes establishing there-between a packet-message stream, for example a PTP stream, mainly for providing the Slave node with timing in reference to the Master node. FIG. 1 (prior art) shows one option of monitoring/measuring parameters of data transmission via a packet-switched network 10, such as MEN. Let us assume that we are interested in providing so-called timing distribution in the network. FIG. 1 illustrates a setup for measuring PDV for an exemplary Ethernet Service being transmitted through a provider network such as MEN 10, between two demarcation points located at two peer elements PE: PE(source) 12 and PE-C 14 (destination, customer side). Peer element 12 may be (or be connected to) a master node such as a node setting time clock which is considered absolute for the network, while peer element 14 may be (or be connected to) a slave node obtaining its time clock with reference to the clock of the master. In other words, timing distribution is being provided throughout network 10. The timing distribution is closely related to monitoring/measuring of packet delays or packet delay variation PDV at slave nodes (say, node 14), with reference to the master node. To measure delays of the Ethernet service in the packet-switched network 10, one may create an Ethernet CFM (Connectivity Fault Management) protocol packet bidirectional stream 11 between the two peers PEs 12 and 14 (e.g., CFM with Y.1731 delay measurement extension of the CFM).

One drawback of such a solution is that, though being sensitive to PDV, the CFM packet stream is different from a PTP protocol pattern. The PTP (Precision Time Protocol) is widely accepted in modern networks and is therefore preferred by the majority of service providers and operators.

Another drawback is that the CFM stream 11 consumes a certain amount of bandwidth BW in the MEN.

As already mentioned, in order to distribute timing (frequency and phase) information in a modern data packet-switched network, it is preferred to use the PTP protocol over the packet-switched network.

FIG. 2 (prior art) illustrates an example of a setup in which a PTP protocol is used for such a purpose in a data packet-switched network comprising MEN 10.

The term "timing distribution" as used herein should be understood for example (but not exclusively), as enabling a time schedule in a cellular network for interaction between cellular base stations in order to regulate time slots of their communication with the users mobile devices.

The PTP protocol is suitable for the above purposes and is thus sensitive to PDV distribution in the network. Therefore it would be reasonable to monitor/measure PDV for a PTP service, e.g. along a network path of the service. Assuming that there is a number of cellular base stations that form a chain in the network, it is accepted in the art that each of these base stations receives its own PTP service from a central (master) node, and monitors the timing distribution (for example, measures PDV) at the site of the specific base station for its specific PTP service. In case the PDV for the PTP service exceeds a desired predetermined value, the operator of the network may wish to receive an indication (alarm) that such a condition had occurred.

The IEEE 1588v2 standard provides a conventional way of monitoring the timing distribution (with measuring delays/PDV), by creating bidirectional data flows specifically dedicated for the purpose of timing distribution. The functionality of timing distribution is conventionally performed by specifically equipped network elements, and such elements—for example, cellular base stations NodeB—usually perform the full set of the required operations (clock+phase recovery, the discussed delay measurement, etc.).

In FIG. 2, the standardized PTP technique orders to launch a PTP data stream 1 between the PTP master node 16 and a first customer node PE-C1 (Slave 1, marked 14). Since slave 1 is connected in chain with Slave 2, a PTP data stream 2 is established between master node 16 and PTP Slave node 2, 20. At least one of the slaves may be implemented in a Customer's Premised Equipment ("CPE") such as CPE of NodeB. Each of the PTP Slaves 1 and 2 should be able to recover the clock and the phase of the received packets, and to perform necessary PDV monitoring/measurements for the specific respective data streams.

Any additional node (such as node 18 or node 22) in the network would also need timing distribution with reference to the master node 16. It would therefore need to be provided with an additional PTP slave functionality in each of the nodes (Slave 3, Slave 4), and would require establishing an additional PTP service flow for each of the slave nodes (see PTP stream 3 and PTP stream 4).

One of the main drawbacks of the conventional setup illustrated in FIG. 2 is in that the PTP master 16 has to handle an additional Slave function for every additional Slave node, i.e. to create an additional PTP service stream, a task which is not always possible due to a limited number of Slave functions which may be supported by a single PTP Master. Also, every new Master-Slave stream also consumes a certain amount of BW in the MEN.

OBJECTS AND SUMMARY OF THE DISCLOSURE

It is therefore an object of the present invention to provide a method which would overcome the drawbacks of the conventional known methods for timing distribution in modern packet-switched networks (comprising domains such as Metro Ethernet networks MEN, MPLS, pure Ethernet, Ethernet Provider Bridge, IP/UDP, Ethernet over MPLS, etc.) while using PTP-type protocol. The operation of timing distribution is widely known, especially for cellular networks and usually comprises processing of timing specific for a particular node (so-called slave node) in the network, the processing being accompanied with clock & phase recovery, measuring packet delay and/or packet delay variation PDV, and the like for that particular node.

In one preferred example of the invention, there is provided a method for carrying out various necessary measurements in order to enable timing distribution in a packet-switched network, by providing one or more virtual/snooping/quasi slave nodes capable of calculating parameters (such as timing), at certain points of the network without producing additional traffic and/or signaling, just by passively utilizing (processing) PTP-type packet streams already existing in the network.

The PTP-type packet stream should be understood as being a service packet stream with a possibility of having a timestamp associated with its packets.

For the sake of simplicity, we will further describe the invention, assuming that the packet-switched network comprises an Ethernet domain, and that the PTP-type stream is the widely known and widely used PTP packet stream (according to IEEE 1588v2). Each PTP stream comprises only PTP protocol messages of various types.

According to a first aspect of the invention, there is provided a method for timing distribution (e.g. clock distribution) in a packet-switched network, the method being characterized in that at least one network node is used as a quasi slave node, located at a path extending between a master node and a slave node, wherein the method comprising a step of retrieving timing at the network node by passively (i.e. non-intrusively) processing packets belonging to a PTP-type packet stream being exchanged between a master node and a slave node and conveyed via that network node operating as a quasi slave node.

According to another embodiment, the packet-switched network comprises an Ethernet domain, and the PTP-type packet stream is a PTP-type packet stream which is transmitted in conformity with IEEE Recommendation 1588v2.

By yet another embodiment, the slave node is operative to exchanging PTP-type messages with the master node to enable obtaining the slave node's timing with reference to the timing of the master node, and wherein the method comprising:

selecting an intermediate network node located at the path between the master and slave nodes, to serve as a quasi slave node;

ensuring that the intermediate network node has at least partial functionality of the slave node. This way the selected intermediate node becomes a quasi (virtual, snooping) slave node;

at the intermediate network node, passively processing the PTP-type stream (wherein the PTP-type stream comprises PTP messages exchanged between the master node and the slave node), and retrieving the timing for the quasi slave node;

if the timing retrieved by the quasi slave node does not match one or more predetermined criteria, generating an alarm to indicate the a mismatch (e.g. to a monitoring and/or managing entity, such as a network management system for example).

In accordance with still another embodiment, the passive processing of the PTP-type stream at the quasi slave network node comprises generating internal timestamps for that network node, and associating the internal timestamps to packets of the PTP-type stream arriving at said network node. Optionally, this embodiment further comprises refraining from associating the internal timestamps to packets which have not arrived at the network node as part of the PTP-type stream.

By yet another embodiment, the processing includes the steps of clock & phase recovery, measuring packet delay and/or packet delay variation PDV for the network node.

According to another embodiment, the predetermined criteria comprise a specific value of time delay and/or PDV at the point at which the network node is located.

In accordance with another embodiment, there is a plurality of network nodes used as quasi slave nodes, which are located along a path extending between the master node and the slave node.

By another embodiment, the PTP-type stream is a PTP packet stream consisting of PTP packets/messages. It is assumed that a PTP-type packet steam is established between a master node and a slave node in the packet-switched network, prior to passively processing the PTP-type stream by the quasi slave node, and to retrieving the timing for that quasi slave node, as provided by the present invention.

The term "passive processing" as used herein (e.g. by implementing partial functionality of the virtual slave node) may be understood as the functionality to process the PTP-type stream and the messages exchanged between the Master node and the Slave node, in order to generate measurements/timing data there-from. This partial functionality is passive and does not require/include the ability to generate PTP-type messages at the virtual slave node itself (say, towards the Master node).

In general, the term "PTP-type messages" as referred to herein should be understood to encompass packets associated with timestamps which are generated by the Master node and the Slave node and exchanged there-between. To be more specific, PTP messages physically carry an original timestamp of a Master node, while other timestamps are produced at a Slave node and logically associated with the PTP messages when they arrive at/depart from the Slave node.

The partial functionality of the virtual slave node, i.e. the processing of the PTP stream arriving at that virtual (quasi) slave node, comprises generating its local/internal timestamps and associating them with outgoing PTP packets of the "intercepted" PTP stream, without generating its own PTP messages.

The PTP stream processing at the virtual slave node may be performed for obtaining the timing specific for the particular intermediate node within the network. The processing may include clock & phase recovery, measuring packet delay and/or packet delay variation PDV for the particular intermediate node, and the like. Still, the functionality of the virtual slave node is passive since the processing does not include self-generation of messages that are normally generated by a conventional slave node.

In another embodiment, the master node and the slave node are both nodes located in respective access networks interconnected by a network such as MEN.

By yet another embodiment, the master node and the slave node are a central node and a cellular base station (nodes B), respectively, wherein the Master node is provided with a precise clock (e.g. atomic clock, GPS, etc.) whereas the Slave node obtains its timing with reference to the Master node.

According to another aspect there is provided a network node adapted to operate in a packet-switched network and provided with hardware and/or software means enabling the network node to operate as a quasi slave node, adapted to intercept and passively process packets belonging to a PTP-type packet stream being exchanged between a master node and a slave node and conveyed via that network node operating as an intermediate node, and retrieve timing information therefrom.

In accordance with another embodiment, the packet-switched network comprises an Ethernet domain and said PTP-type packet stream is a PTP-type packet stream which is transmitted in conformity with IEEE Recommendation 1588v2.

By yet another embodiment, the network node comprises a processing unit adapted to process the packets belonging to a PTP-type packet stream, the processing unit is adapted to process the arriving packets and retrieve timing for the network node, and in case the timing retrieved by the network node does not match one or more predetermined criteria, the processing unit is further adapted to generate an indication related to this mismatch.

According to still another embodiment, the network node is adapted to operate selectively in a conventional slave mode and/or in a quasi slave mode.

In accordance with another embodiment, the network node is adapted to be installed as an edge node located at the border of an Ethernet network domain and of an access network, thereby enabling carrying out diagnostics of problems occurring in the Ethernet network domain and/or in the access network.

Still, virtual nodes may be installed at more than a single point along the path extending between the Master node and the Slave node, thereby enabling the operator to check the timing distribution over the Ethernet network and/or the access network(s).

It should be noted that processing of the PTP data packet stream at the virtual slave node is typically performed without terminating the data stream (e.g., by processing copies of its packets), which means that the fact that such a virtual slave is installed somewhere along the path is not necessarily recognized by the Master node.

The network management system may be, for example, NMS of the Ethernet network domain. The Ethernet network domain may be a Metro Ethernet Network MEN.

The predetermined criteria may, for example, comprise a specific value of time delay and/or of PDV at a network point being served by the intermediate node. For example, when the time delay variation is too high (i.e., the timing at the point of interest cannot be set to accommodate such a delay), an alarm may be sent to the management system in order to indicate the existence of a problem in that section of the network, thereby providing the possibility to initiate maintenance operations thereat.

Preferably, the passive processing is similar to a conventional processing carried out by the slave node, with the exception that at the intermediate node (where passive processing is carried out) no PTP-type packets are generated.

The quasi slave node may perform various measurements that can be used for monitoring and managing the packet-switched network. Preferably, it may be adapted to calculate timing at its location within the network, and consequently to support/perform timing distribution within the packet-switched network.

In other words, the proposed network node, adapted to operate as an intermediate node, is provided with a processing unit, PU, for processing a PTP-type packet stream being conveyed along a path extending between a master node and a slave node, wherein the proposed network node being capable of processing the PTP-type packet stream of messages exchanged between the master node and the slave node, each packet of the PTP-type packet stream carries an original master's timestamp, to obtain the slave node's timing with reference to the master node's timing, wherein the PU is adapted to:

passively process packets belonging to the PTP-type packet stream being exchanged between the master node and the slave node, by utilizing original and local timestamps of the packets being passively processed, and to calculate timing for the proposed network node (operative as an intermediate node); and in case the timing as calculated at the proposed network node does not meet one or more predetermined criteria, the PU is adapted to generate an alarm to a monitoring and/or managing entity (for example, to a network management system).

The proposed intermediate network node described hereinabove therefore passively simulates the slave node and serves as a virtual (snooping, quasi) slave node.

According to another embodiment, the network node is provided with a dual functionality thereby it may be selectively operative either as a conventional slave node or as a snooping slave node, as may be required by the network operator.

By yet another embodiment, the network node is operative to simultaneously process different PTP-type packet stream.

According to another aspect, there is provided a computer readable medium storing a computer program for performing a set of instructions to be executed by one or more computer processors, the computer program is adapted to perform the method described hereinabove.

The computer readable medium is preferably designed to be installed at a network node which could then serve as an intermediate network node (a virtual slave node), and/or a conventional slave node.

According to still another embodiment the computer readable medium is adapted to enable a network node at which it has been installed, to operate in two modes, i.e. to operate on one PTP-type packet stream as a conventional slave node, and to operate on another PTP-type packet stream as a quasi slave.

By yet another embodiment, the network node may operate in the two modes simultaneously when operating on two on more PTP-type packet streams arriving simultaneously thereat.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE PREFERRED EMBODIMENTS

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
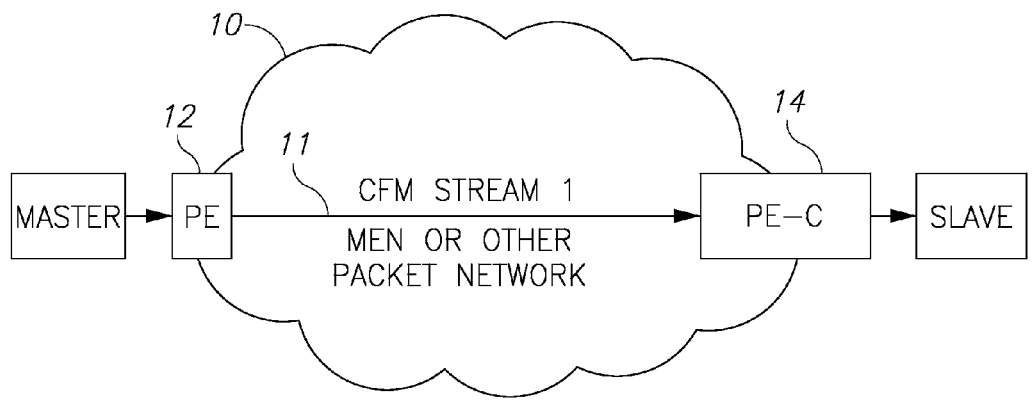
FIG. 1 (prior art) shows a known way of timing distribution/measuring packet delays in an Ethernet packet-switched network.
Figure 2:
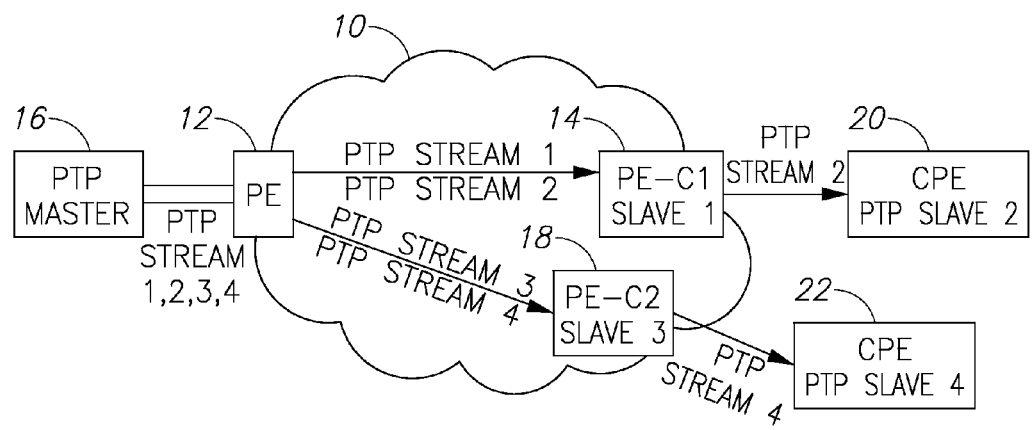
FIG. 2 (prior art) shows a conventional way of timing distribution in combined networks comprising an Ethernet domain, by using a PTP protocol.

FIGS. 1 and 2 have been described in the background section of the description.

Figure 3:
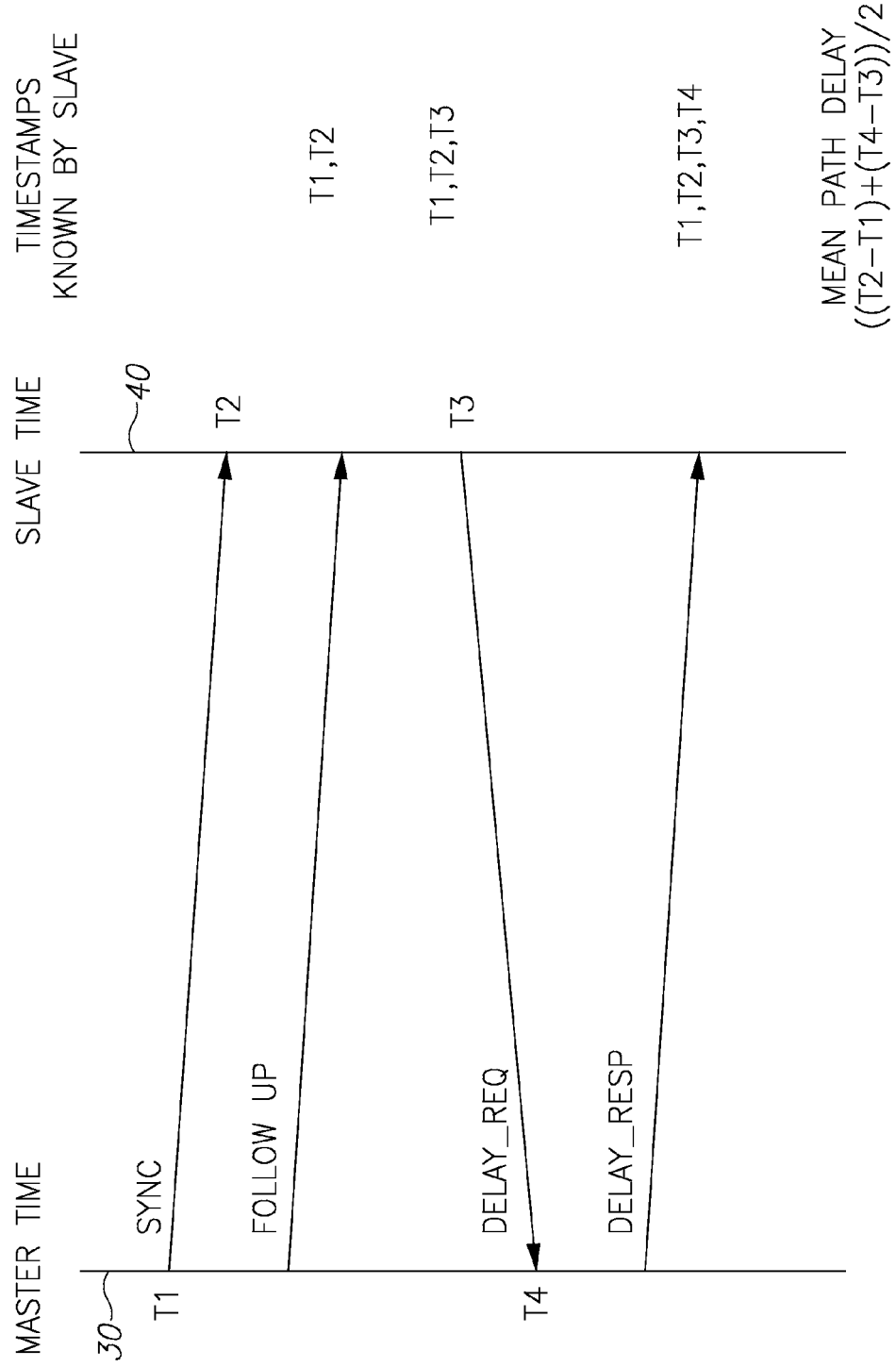
FIG. 3 (prior art) illustrates a schematic view of PTP messages being exchanged between a conventional master node and a conventional slave node, for exchanging time stamps and for calculating delay.

FIG. 3 shows a master node's time line 30 and a conventional slave node's time line 40. The description of the following example is compatible with the PTP as disclosed in IEEE 1588v2. Let us assume that the master node sends a PTP data stream (not shown) to the slave node, and provides the PTP stream with an inbound message. For example, the message Sync is provided with time stamp T1, being the master node's reference time. There is also an optional message Follow Up sent from the master node to the slave node. Let us assume that the message Sync is received at the slave node at time T2. Upon receiving the Sync message or the optional Follow Up message, the slave node sends to the master node a Delay request message and marks it with the time stamp T3. In response, the master node replies by sending the Delay response message marked with its own corresponding time stamp T4. Since the slave node has now all the time stamps required, it may calculate the mean path delay MPD (half round trip delay) using the equation provided by the PTP protocol.

$$MPD=((T2-T1)+(T4-T3))/2$$

Figure 4:
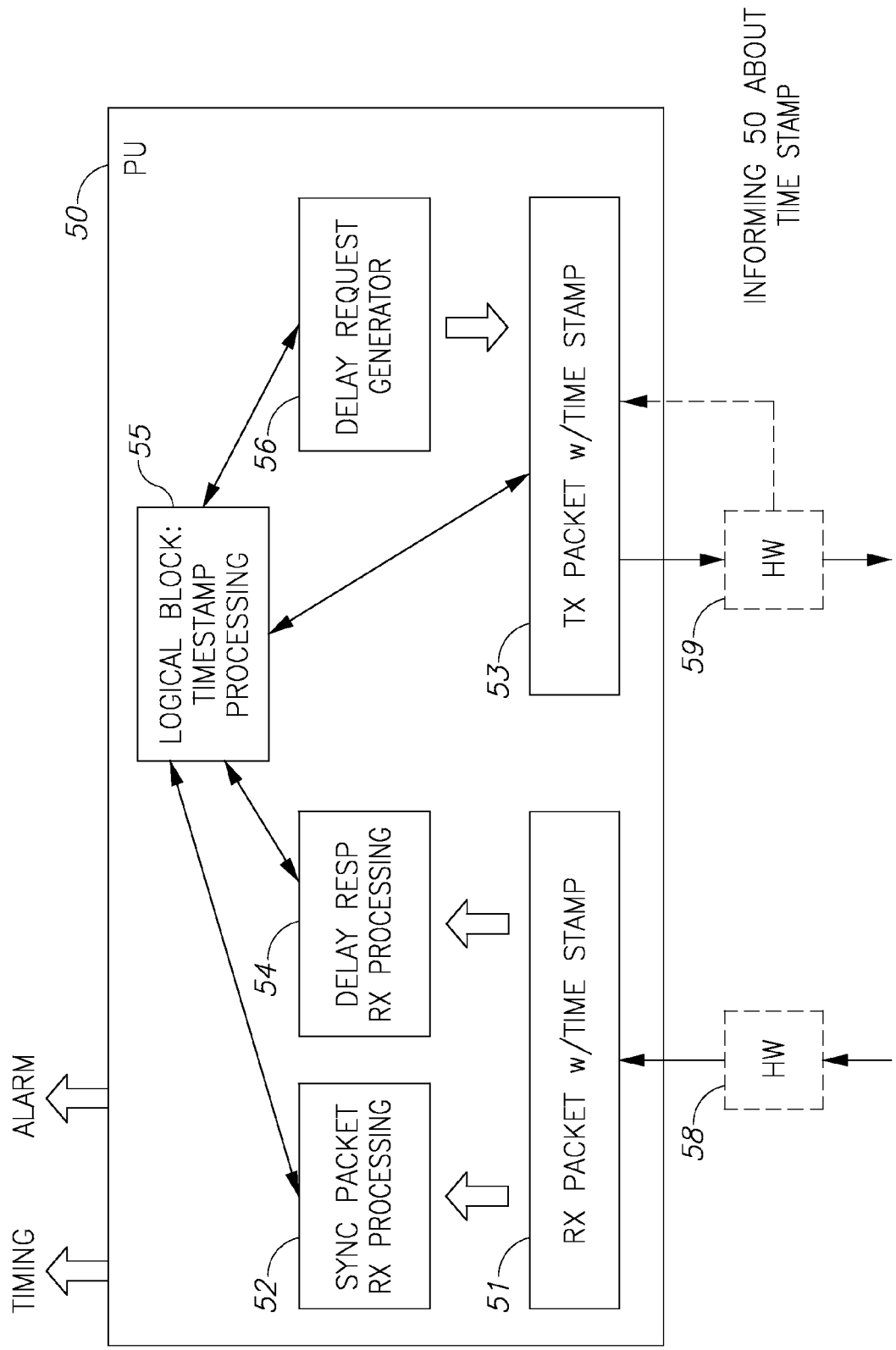
FIG. 4 (prior art) illustrates a schematic block diagram of a conventional slave node.

FIG. 4 illustrates a conventional slave node's processing unit PU 50 interacting with a receiving port (RX) 51 and a transmitting port (TX) 53 of the slave node.

The PU 50 receives all PTP data packets (messages) provided with time stamps that arrived at RX port 51 and generates and forwards PTP data packets with time stamps towards port 53. Hardware block 58 generates and logically associates local timestamps with incoming PTP packets/messages, while hardware block 59 generates and associates local timestamps with outgoing PTP packets/messages. Blocks 58 and 59 inform the PU 50 about the generated local timestamps.

PU 50 comprises block 52 operative to process the Sync (and optionally the Follow_Up) packets received from master node(s), wherein each such a packet physically carries the first (original that was generated at the master node) time stamp T1, and arrives to the slave node at time T2 (see FIG. 3). Both time stamps T1 and T2 are registered at block 52. Block 54 of PU 50 processes Delay_response packets received from the master node at port 51, and retrieves timestamp T4. Block 56 of PU 50 is a generator of a Delay request, which is to be sent from transmission port 53 of the slave node to the master node, and is associated with time stamp T3. Time stamps T1, T2, T3 and T4 are then processed by PU 50, e.g. in logical block 55 to establish the mean (average) path delay MPD, and simultaneously to calculate and set the timing of the slave node (using the same timestamps). In case the required timing cannot be reached, for example due to a great delay variation PDV between the master and the slave, PU 50 may issue an alarm. The timing and the alarm may be forwarded to a network managing entity, for example to NMS of the related network.

Figure 5:
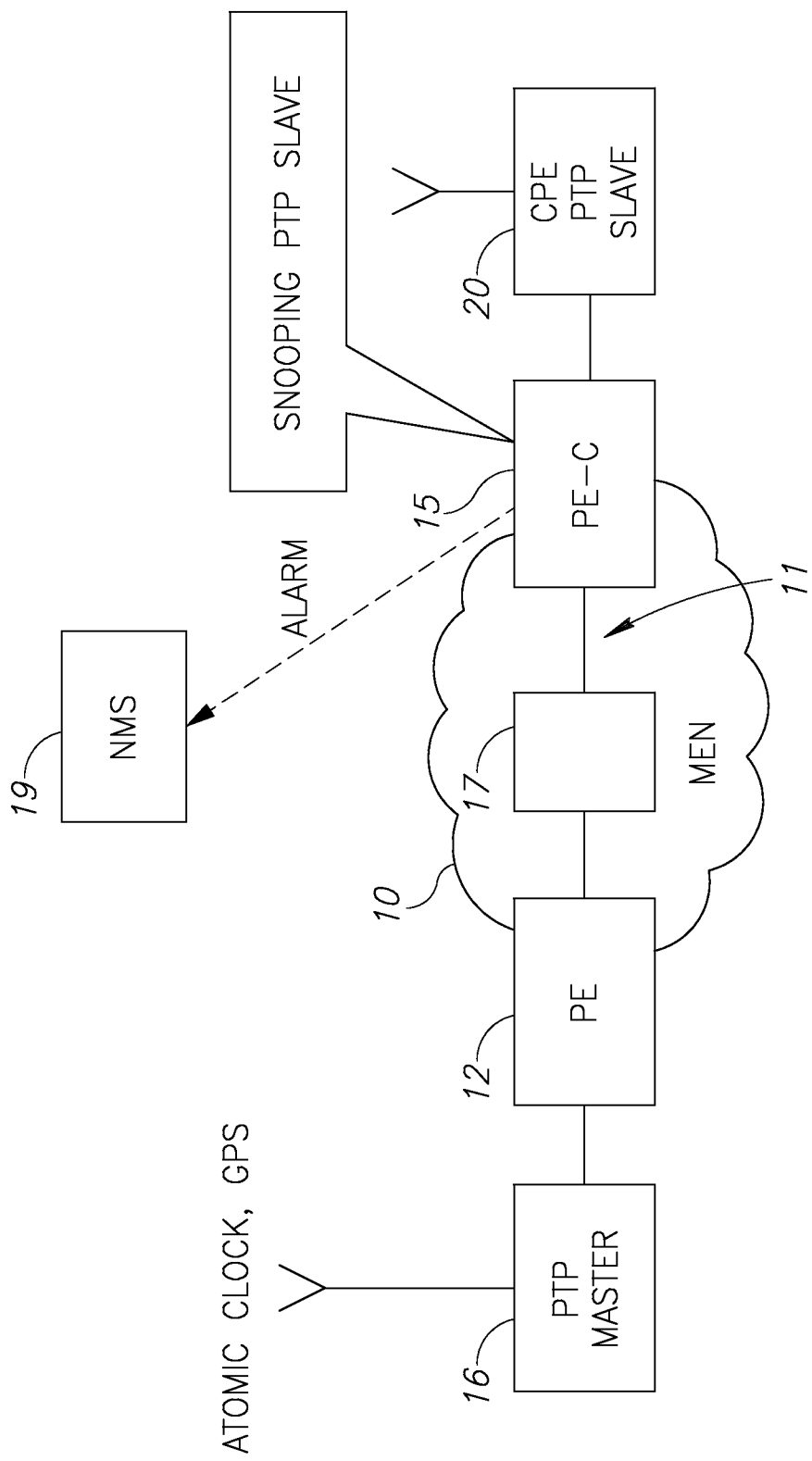
FIG. 5 illustrates a schematic view of the proposed method for timing distribution to any required point within a packet-switched network, without providing additional conventional slave nodes.

FIG. 5 illustrates schematically one embodiment of the solution provided by the present invention for timing distribution in a packet-switched network, such as a metro Ethernet network MEN 10 interconnected with access packet-switched networks comprising the master node 16 and the conventional slave node 20.

A PTP protocol (preferably IEEE 1588 v2) is used for generating various data packet flows in the network. Let us assume for example that one of these data flows (marked 11) has already been previously established to exchange communications between a master PTP node 16 associated with the peer PE node 12, and any node (say, node 20 being a PTP slave node) associated with PE-C node 15 (PE-C is a peer edge node associated with a customer, or customer faced peer). Now, let us assume that the service provider of the MEN network 10 is interested in obtaining information that relates to the performance of the network (say, delay, PDV, and/or timing at that point) at a border point where node 15 is installed. Such information may be required, for example, for the purposes of diagnostics and/or for locating problematic segments along service path 11.

If one were to follow the conventional way of timing distribution, the border node 15 would have provided such information only if it becomes an additional conventional slave node. Such a solution could be unacceptable for master node 16 since it would require establishing an additional PTP data packet stream and providing the border node 15 with full slave functionality.

The PTP functionality required for performing the measurement has usually been divided between the master and the slave. The slave functions were to be implemented by the customer premises equipment (CPE) of an access node (e.g. LTE eNodeB of 4G cellular networks). For such a case, an additional PTP stream would have been required for each additional slave node.

However, due to internal resources limitations of the PTP master node 16, the latter might be unable to manage both the conventional PTP slave node 20 and an additional "slave-to-be" node 15.

The solution proposed by the present invention overcomes such a drawback. According to this solution the functionality of the PTP slave node is partially provided by an intermediate node located at a path of an already existing PTP data stream in a Ethernet network. Using this existing PTP stream, allows according to the solution provided, creating a passive "snooping/quasi slave" instead of creating a conventional active slave.

Thus, according to an embodiment of the invention, PE-C node (node 15) may be converted into a snooping slave node having partial slave functionality, so that node 15 will be able to process information contained within the same PTP stream 11 (i.e., to process the PTP messages passing through node 15).

Parameters that are calculated by virtual/snooping node 15 (for example, the timing of the node) may be reported to a Network Management System 19. If delay/PDV in the path 11 is higher than a predetermined threshold, the node 15 may forward an alarm to the NMS, for taking further decisions by the latter. Other alarms are also possible (for example, slave leaving its "Locked" state, e.g. due to the growing PDV).

The snooping slave 15 is preferably operative in a continuous mode, using an existing master-slave PTP stream for measurement of delays and PDV, and/or for calculating the timing of the snooping slave (e.g. for clock+phase recovery).

The snooping slave preferably does not terminate the packet stream, but just monitors it. Actually, the proposed method may be considered as a method to piggyback existing packet flows (e.g. packet streams that were previously created by a customer), instead of creating its own packet stream for the purpose of various measurements/timing distribution.

As will be appreciated by those skilled in the art, more than one snooping slaves (for example, node 17) may be provided in the network on one and the same path of any existing PTP packet stream. Though only one existing PTP stream is shown in FIG. 5 (between master 16 and slave 20), there may exist other PTP data streams, say between master node 16 and other access nodes (not shown) being conventional slave nodes.

It should be noted that according to this embodiment the master node does not perceive the proposed snooping slave node as a conventional slave node, since the latter is passive and thus unseen by/hidden from the master node. Therefore, the solution provided by the present invention allows to overcome the prior art limitation on the number of slave nodes that can be used for a single PTP packet stream.

It is further proposed by another embodiment of the invention that a network node may be provided with a dual functionality, i.e. to be operative either in a mode of a conventional slave node or in a mode of a snooping Slave node, or both (for different PTP packet stream).

As would be appreciated by those skilled in the art, the solution provided by the present invention offers a number of advantages over the prior art solutions. According to the present invention solution one may obtain results of PDV measurements for the desired protocol (PTP-type), and carry out measurements for any number of snooping slave nodes from the same master node, while keeping the master node (16) itself unaware of the snooping nodes (15, . . . ) and at the same time to operate conventionally with the same, unchanged number of real slave nodes (20, . . . ) that the master slave had been connected to.

It should also be noted that the above-described quasi slave nodes may be located at one or both of the access packet-switched networks shown in this figure.

Figure 6:
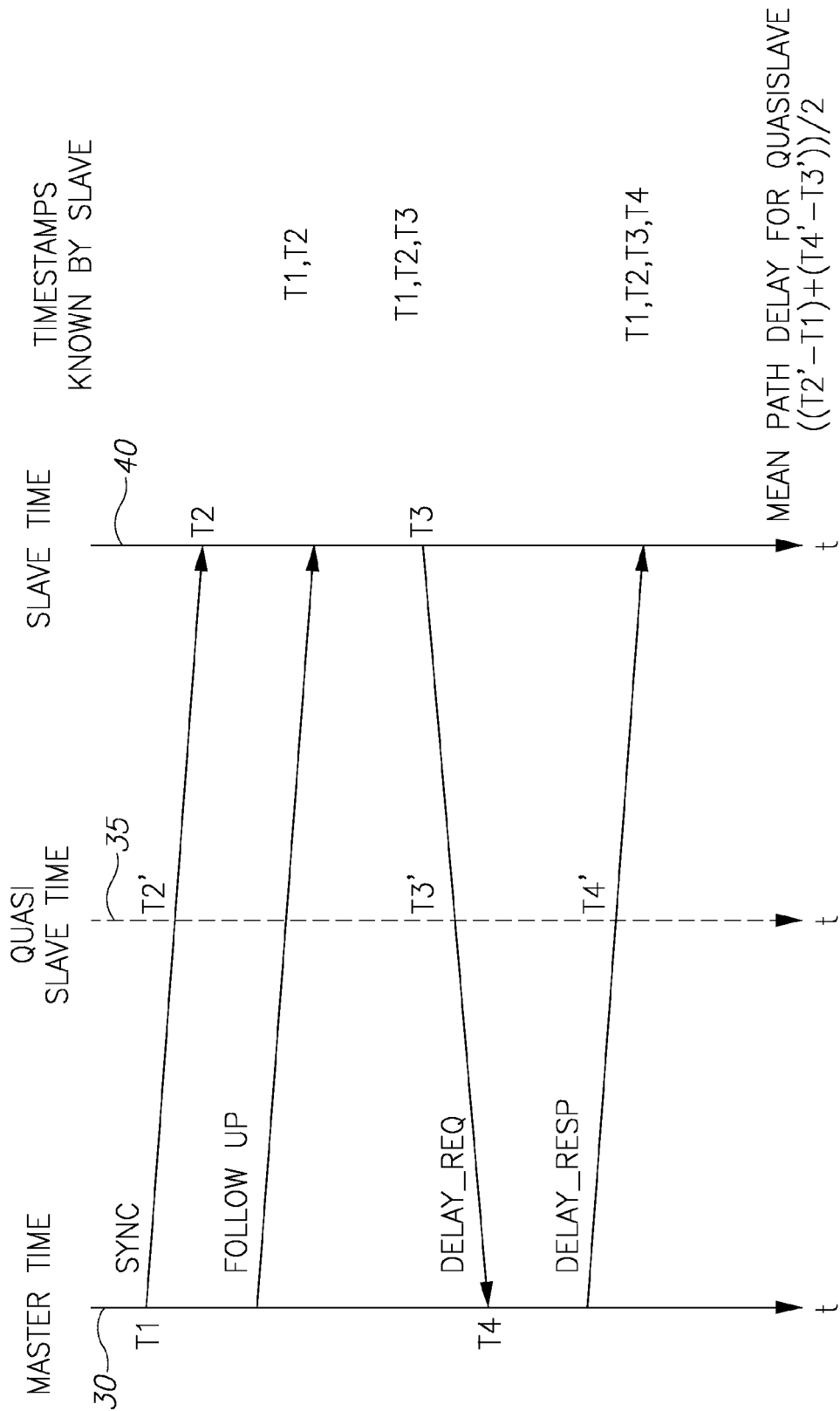
FIG. 6 illustrates schematically exchange of time stamped messages between conventional master and slave nodes that can be intercepted and utilized by a virtual slave node.

FIG. 6 illustrates a time line 35 of the proposed virtual slave node, located at the network extending between the master node (with its time line 30) and the conventional Slave node (with its time line 40). If one compares FIG. 6 with FIG. 3, one may notice that the virtual slave node does not generate any PTP messages, but just "intercepts" (non-intrusively) the ones being exchanged between the master and the slave nodes. Based on the "intercepted" messages carrying original timestamps T1 of the master slave, the virtual slave node generates its own, local timestamps T2', T3' and T4' (e.g. by using its internal HW block shown in FIG. 7). Time stamps T2' and T4' are generated at the input of the snooping node, whereas timestamp T3'—at its output. The locally generated timestamps are provided to the processing unit of the slave node, by logically associating them with the intercepted PTP messages.

One should keep in mind that the original time stamp T1 remains the same since it is the absolute master node's timestamp. Using the original and the generated local timestamps, the virtual slave node is able to calculate its mean path delay MPD and its timing according to the same formula as presented with reference to FIG. 3.

Figure 7:
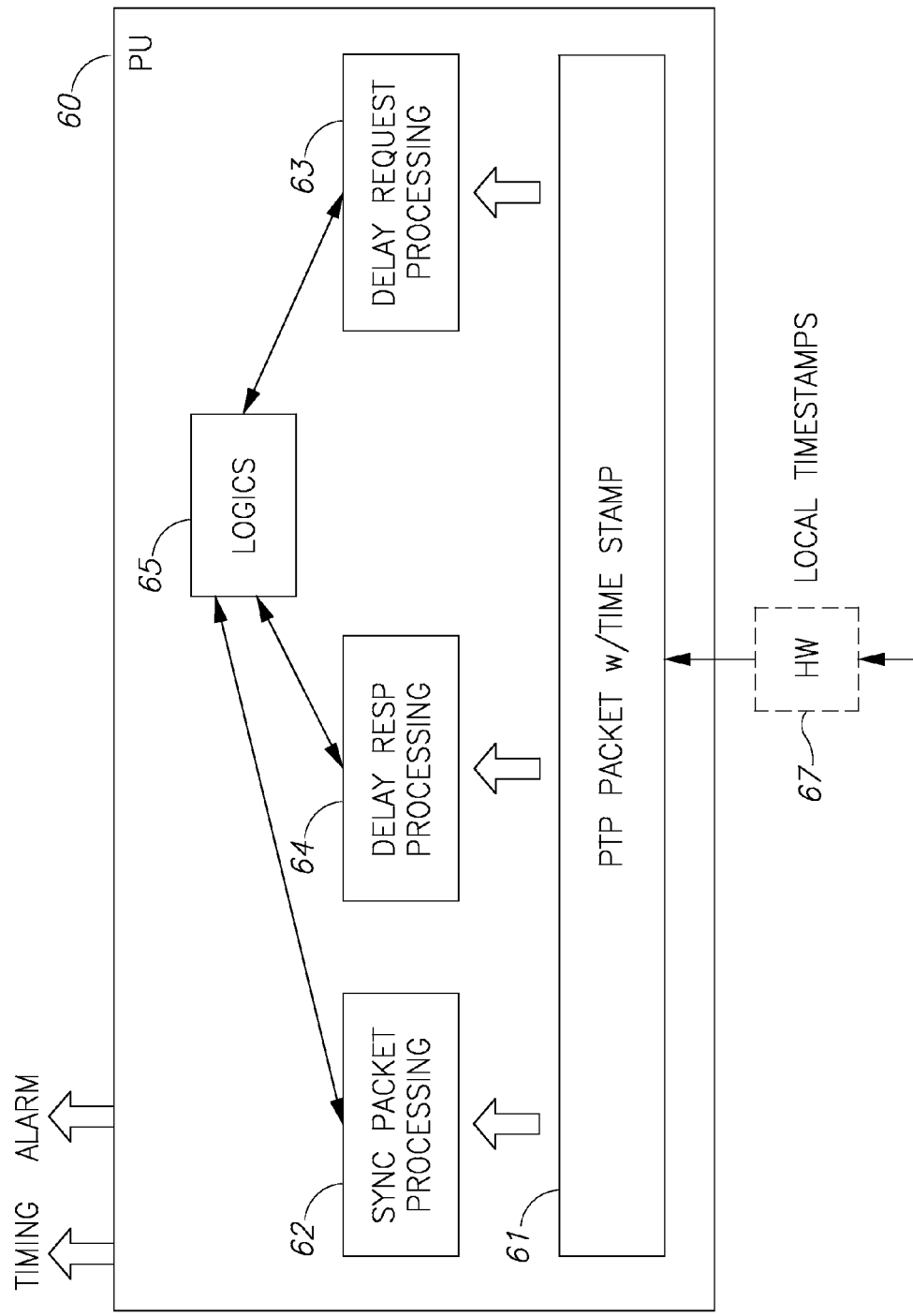
FIG. 7 is a schematic block diagram of the proposed virtual slave node.

FIG. 7 illustrates schematically a processing unit PU 60 which may be provided in a snooping/virtual/quasi slave node. PU 60 differs from PU 50 of the conventional slave node (see FIG. 4) in that there is no generation of PTP messages and therefore no transmission thereof. The quasi slave node transparently passes the PTP packets there-through, though performs its own monitoring and processing of these packets. PU 60 illustrates only this internal processing. PU 60, via a receiving port (RX) 61, receives all PTP messages/packets intercepted by the virtual slave node, and associates them with local/internal timestamps generated at the hardware block 67. Different messages are processed by different respective blocks 62, 64 and 63 and then by a logical block 65, where the latter is responsible for processing internal timestamps and for clock & phase recovery. Using the local timestamps, the processor 60/block 65 may calculate delay, PDV, obtain its own timing and/or generate alarms.

Figure 8:
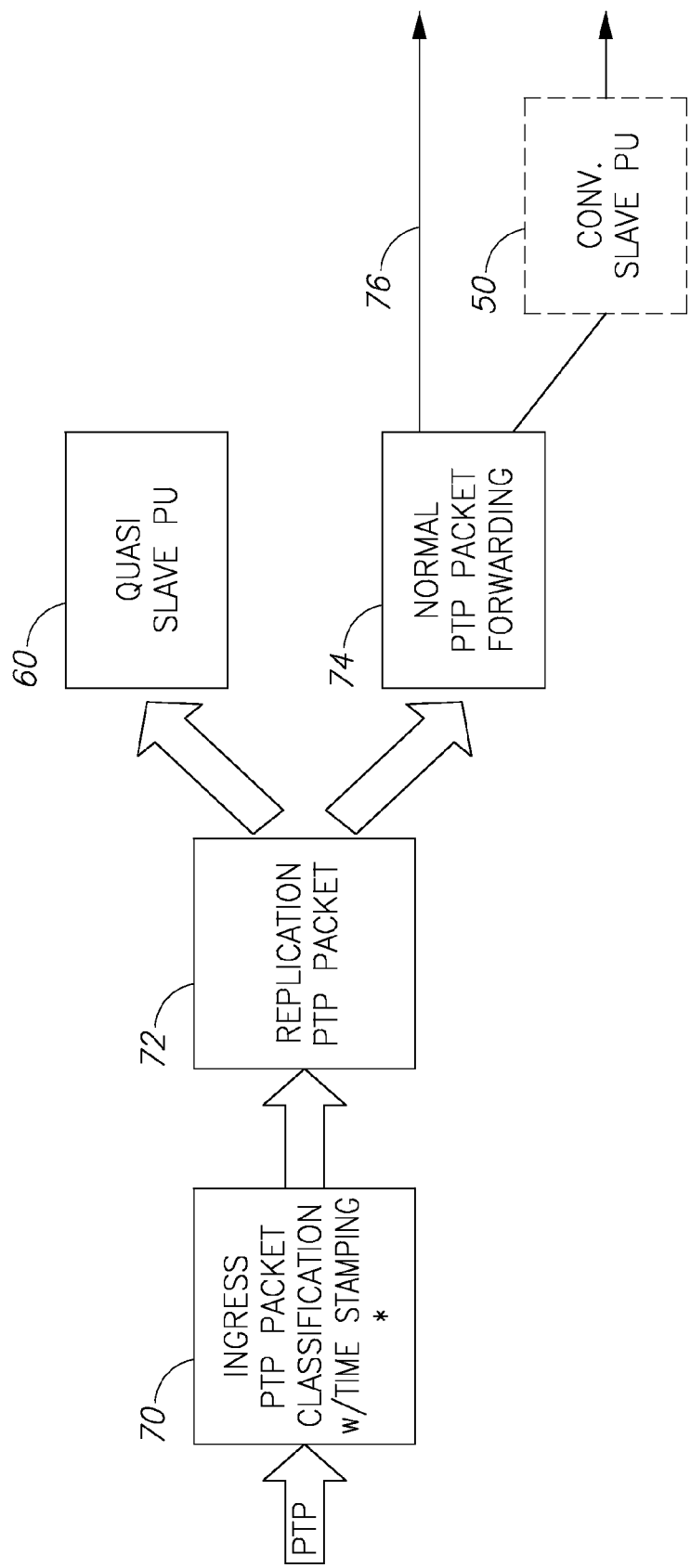
FIG. 8 is another schematic block diagram demonstrating functionalities of a network node which may serve as a conventional and/or as a virtual slave node.

FIG. 8 illustrates schematically a block diagram of a network node designed to have a dual slave functionality, so as to operate according to at least one selected mode at any given time. In the node, any ingress PTP packet undergoes classification (block 70) with logical time stamping, than replication (block 72) in order to produce a copy for processing. One copy is normally forwarded (block 74) to the next node along path 76 or processed as may be required to obtain the functionality of a conventional slave, if the node is operative in that mode (block 50). If a snooping slave mode is selected, the other copy of the received PTP packet is sent to block 60 (the logical stamping has already been provided by block 70). When operating by this mode, the normal PTP forwarding by block 74 remains, to allow transparent passing of the PTP stream through the node.

In case the two branches of the node serve different PTP streams, they may be utilized simultaneously in both modes, i.e. this node operates as a conventional slave node and as a quasi slave node for two respective paths.

Though the invention has been described with reference to a number of specific examples, it should be appreciated that other versions of the method and other embodiments of the virtual Slave node could be proposed, which are to be understood as part of the invention as far as defined by the claims which follow.

The invention claimed is:

1. A method for forwarding a timing related alarm in a packet-switched network that includes a master node and a slave node operative to exchange Precision Time Protocol (PTP)-type messages to enable the slave node to obtain timing of the master node, wherein said method comprising:
   selecting an intermediate network node located at a path extending between the master and slave nodes to serve as a quasi-slave node;
   ensuring that the intermediate network node is configured to passively process the PTP-type messages, wherein passively processing the PTP-type messages includes generating a plurality of local timestamps that includes at least a first timestamp of a first PTP-type message received from the master node and at least a second timestamp of a second PTP-type message received from the slave node, the plurality of local timestamps are used for internal processing at the intermediate network node;
   at the intermediate network node, passively processing a plurality of PTP-type message exchanged between the master node and a slave node;

at the intermediate network node, calculating a value derived from at least the first timestamp and the second timestamp;

at the intermediate network node, determining that the value does not meet at least one predetermined criterion; and when said value does not meet the at least one predetermined criterion, forwarding a timing related alarm to a network managing entity.

2. The method according to claim 1, wherein the packet-switched network comprises an Ethernet domain, and the PTP-type message is transmitted in conformity with IEEE Recommendation 1588v2.

3. The method according to claim 1, wherein the passively processing the PTP-type messages further includes associating said local timestamps with the PTP-type messages.

4. The method according to claim 1, wherein the passively processing the PTP-type messages further includes the following steps:

recovering clock and/or phase related data, and measuring packet delay and/or packet delay variation (PDV) at said network intermediate node.

5. The method according to claim 1, wherein the at least one predetermined criterion comprises a specific value of time delay and/or a specific value of packet delay variation (PDV) at a location where said intermediate network node is located.

6. The method according to claim 1, wherein said packet-switched network comprises a plurality of network nodes used as intermediate network nodes located along a path extending between the master node and the slave node.

7. A non-transitory computer readable medium storing a computer program for performing a set of instructions to be executed by one or more computer processors, the computer program is adapted to perform the method of claim 1.

8. The method according to claim 1, wherein the value is associated with time delay of the plurality of PTP-type messages.

9. A network node configured to be located at a path extending between a master node and a slave node and configured to operate in a packet-switched network as a quasi-slave node, wherein the network node comprising:

a memory configured to store a computer program for performing a set of instructions; and at least one processor configured to:

enable the slave node to exchange time stamped messages with the master node to obtain the timing of the master node;

passively process a plurality of Precision Time Protocol (PTP)-type messages exchanged between the master node and the slave node, wherein passively processing the PTP-type messages includes generating a plurality of local timestamps that includes at least a first timestamp of a first PTP-type message received from the master node and at least a second timestamp of a second PTP-type message received from the slave node, the plurality of local timestamps are used for internal processing at the intermediate network node;

calculate a value derived from at least the first timestamp and the second timestamp;

determine when the value does not meet at least one predetermined criterion; and when said value does not meet the at least one predetermined criterion, forward to a network managing entity a timing related alarm.

10. The network node according to claim 9, wherein the packet-switched network comprises an Ethernet domain and the PTP-type message transmitted in conformity with IEEE Recommendation 1588v2.

11. The network node according to claim 9, further configured to operate selectively in a conventional slave mode and in a quasi slave mode.

12. The network node according to claim 9, installed as an edge node located at the border extending between an Ethernet network domain and an access network, configured to carry out diagnostics of problems in the Ethernet network domain and/or said access network.

* * * * *